United States Patent [19]

Coutant

[11] Patent Number: 5,715,744
[45] Date of Patent: Feb. 10, 1998

[54] DEVICE FOR ROTATING ROTISSERIE SKEWERS

[76] Inventor: Jean Noel Coutant, 4 route de Maignon, F-64600 Anglet, France

[21] Appl. No.: 535,097

[22] PCT Filed: Apr. 19, 1994

[86] PCT No.: PCT/FR94/00436

§ 371 Date: Dec. 15, 1995

§ 102(e) Date: Dec. 15, 1995

[87] PCT Pub. No.: WO94/23628

PCT Pub. Date: Oct. 27, 1994

[30] Foreign Application Priority Data

Apr. 22, 1993 [EP] European Pat. Off. ............ 93401056

[51] Int. Cl.⁶ .................................................. A47J 37/04
[52] U.S. Cl. ........................ 99/421 H; 99/419; 99/421 A; 99/421 R
[58] Field of Search ................... 99/419–421 V, 99/494, 532, 533; 126/25 R, 25 AA; 426/523, 521

[56] References Cited

U.S. PATENT DOCUMENTS

| 2,391,571 | 12/1945 | Hennessey . | |
| 2,485,890 | 10/1949 | Keljik | 99/421 HV |
| 2,854,918 | 10/1958 | Merritt | 99/421 HH |
| 2,939,384 | 6/1960 | Vinson | 99/421 HH |
| 3,848,523 | 11/1974 | Galisz et al. | 99/421 H |
| 3,858,495 | 1/1975 | Gotwalt | 99/421 HH |
| 3,866,527 | 2/1975 | Katris . | |
| 3,939,761 | 2/1976 | McGinty | 99/421 H |
| 4,112,832 | 9/1978 | Severdia et al. | 99/421 HH |
| 4,154,154 | 5/1979 | Vivian . | |
| 4,158,991 | 6/1979 | Nakashima | 99/421 H |
| 5,001,971 | 3/1991 | Beller | 99/419 |
| 5,007,403 | 4/1991 | Chen | 126/25 R |
| 5,058,493 | 10/1991 | Basek et al. | 99/339 |
| 5,168,798 | 12/1992 | Kristofich et al. | 99/421 H |
| 5,172,628 | 12/1992 | Pillsbury et al. | 99/419 X |

FOREIGN PATENT DOCUMENTS 1404775 10/1968 Germany .
926692 8/1959 United Kingdom .

*Primary Examiner*—Timothy F. Simone
*Attorney, Agent, or Firm*—Beveridge, DeGrandi, Weilacher & Young, L.L.P.

[57] ABSTRACT

A device for automatically rotating rotisserie skewers includes a holder with a front panel and a rear panel provided with notches on the upper edges thereof for receiving skewers. Each skewer has a handle with a concentric cog wheel. A worm screw driven by a motor rotates the skewers via the respective cog wheels. A cog wheel is automatically disengaged from the worm screw when the skewer rotated by said cog wheel gets stuck, while the other skewers continue to be rotated.

20 Claims, 3 Drawing Sheets

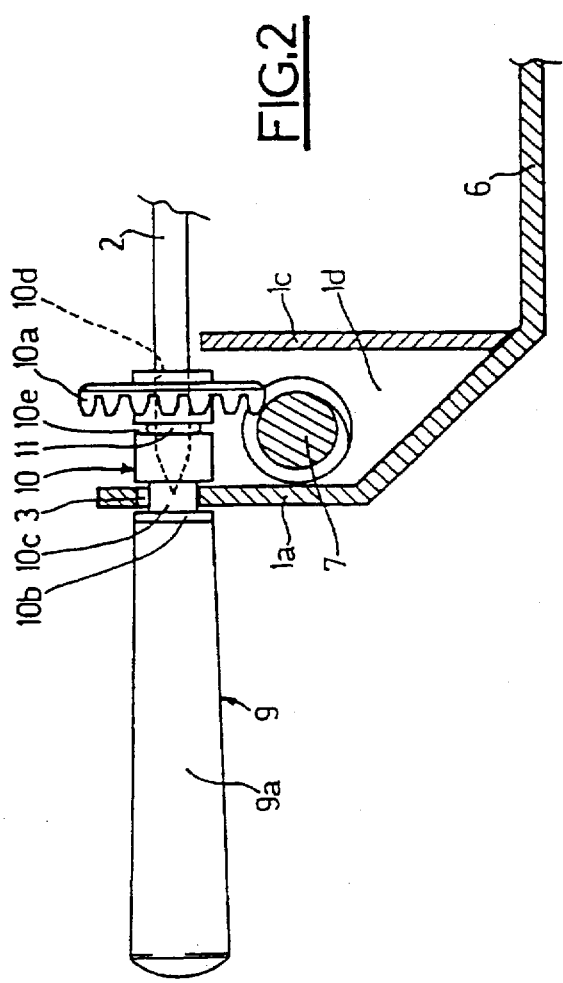
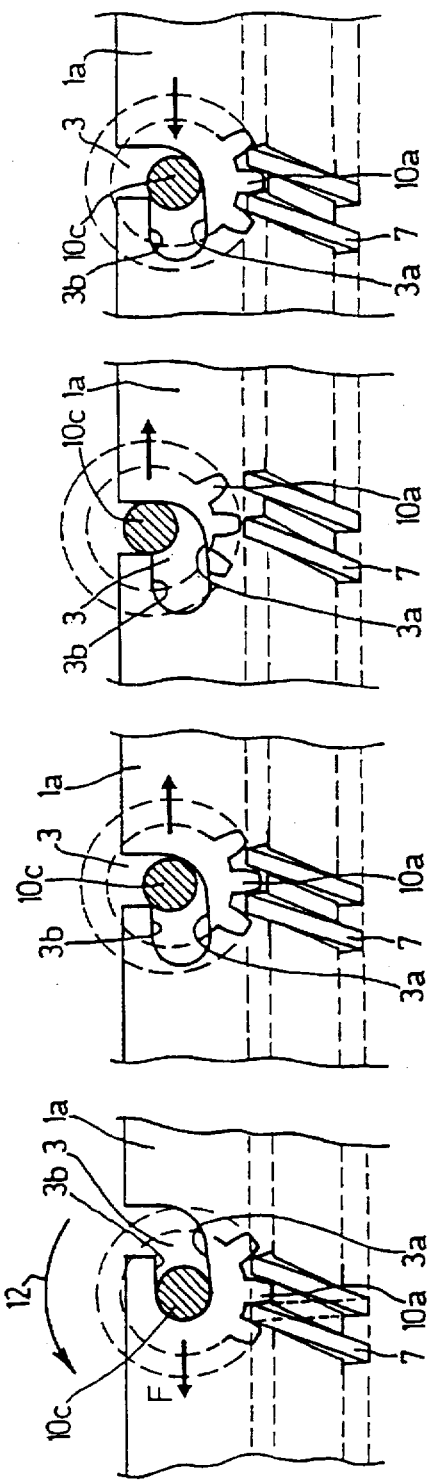

DEVICE FOR ROTATING ROTISSERIE SKEWERS

BACKGROUND OF THE INVENTION

The present invention relates to an automatic kebab turner making it possible to cook foodstuffs threaded on skewers, such as meat, fish and vegetables, close to a source of heat.

Traditionally, kebabs of foodstuffs are cooked over a hearth. The user turns the kebab skewers by hand so as to obtain uniform and optimum cooking of the foodstuffs threaded on the skewers. This manually-controlled cooking requires the user to be sufficiently available and attentive to watch over and to turn the kebabs in order to avoid the foodstuffs being partially overcooked and partially raw.

American Patent U.S. Pat. No. 3,939,761 (McGINTY) makes known a barbecue equipped with a rectangular box open at the top, the front and rear panels of which box exhibit pairs of vertical slots for accommodating kebab skewers. Each kebab skewer exhibits a handle provided with a cog wheel which meshes in an endless chain. The endless chain is driven in movement along the front panel with the aid of a motor. The movement of the endless chain drives the cog wheels and therefore the kebab skewers in rotation above the hearth.

German Patent Application DE-1 404 775 (OATLEY) shows kebab-turning apparatus including a worm driven by a motor. The worm is located parallel to the front panel of the apparatus and meshes with cog wheels of the kebab skewers. The kebab skewers are thus driven in rotation via their cog wheels by the worm.

American Patent U.S. Pat. No. 4,154,154 (VIVIAN) moreover makes known a kebab-turner device which, in contrast with the device described in the aforementioned OATLEY document, requires the kebab skewers to be supported in a cantilever fashion, that is to say requires each kebab skewer to have one end unsupported. Each kebab skewer is driven in rotation by a worm moved by a motor via a cog wheel associated with the kebab skewer.

The current techniques recalled hereinabove do indeed allow the user to be provided with automatic kebab turners for making kebabs. However, in the event of one of the kebab skewers locking up in an untimely fashion, the conventional kebab turner becomes unusable. What happens is that the locking-up of the rotation of one kebab skewer results in the locking-up of the rotation of the cog wheel associated with it. The locking-up of the cog wheel leads to locking-up of the driving endless chain or driving worm which is in engagement with the said cog wheel, because the drive motor is generally selected to produce a drive torque which is not excessive when compared with that required for normal operation of the kebab turner. As a result of this, the slightest locking-up at a kebab skewer leads to the complete locking-up of the kebab turner, which on the one hand gives rise to damage at the motor and drive members and, on the other hand, gives rise to heterogeneous cooking of all the kebabs if the user is not informed of the locking-up of the kebab turner in time.

The untimely locking-up of the kebab turner may be the consequence of the seizure of the drive mechanism especially between the handles of the kebab skewers and the slots in the front panel of the kebab turner. This seizure is brought about by damage to the surfaces for contact between the metal members of the drive mechanism which damage is due especially to corrosion since the kebab skewer is often used in the open air and therefore exposed to inclement weather.

Furthermore, conventional kebab turners cannot be used vertically and require special-purpose kebab skewers without it being possible, for a given kebab turner, to use different types of kebab skewer available for sale commercially.

SUMMARY OF THE INVENTION

The object of the present invention is to remedy the technical deficiency of the existing automatic kebab turners using a mechanism for automatically engaging and disengaging the kebab skewers or skewer whose rotation is locked up, so as to allow the other kebab skewers to continue to be driven in rotation by the motor.

Also, the subject of the invention is a kebab turner of simple design, the cost price for which is low, making it possible to obtain, without mechanical constraint, uniform cooking of the foodstuffs threaded onto the skewers which foodstuffs are not dry, the juices from these foodstuffs being kept in the foodstuffs by virtue of the continuous and even rotation of the kebab skewers.

According to the invention, there is produced an automatic kebab turner which comprising [sic] a support including a front panel and a rear panel, which are each provided with slots on the upper edge for accommodating kebab skewers. Each kebab skewer is equipped at one of its ends with a handle exhibiting a cog wheel. A worm driven by a motor drives the cog wheels associated with the kebab skewers, in rotation.

According to the invention, means are provided for allowing automatic disengagement of one cog wheel with respect to the drive worm in the event of the kebab skewer associated with the said cog wheel locking up.

According to a preferred embodiment of the invention, each slot in the front panel has an elbowed profile which is open at the top, with the outer edge of the elbow rounded. Each kebab skewer handle has a peripheral circular groove allowing the handle to be positioned and held in the elbowed slot. Advantageously, the slots on the front panel have a substantially vertical part emerging in the upper edge of the panel and an elbowed part inclined slightly toward the bottom of the slot. Such a profile favors the mechanism for disengaging the cog wheels in the event of locking-up, as will be described later.

The invention will be better understood and other features will emerge with the aid of the detailed description of a few embodiments taken without any limitation being implied, and illustrated by appended drawings, in which:

BRIEF DESCRIPTION OF THE DRAWINGS

FIG. 2 is a partial sectional view along a kebab skewer of the kebab turner of FIG. 1, FIGS. 3a to 3d represent diagrams explaining the method for disengaging and engaging a cog wheel with respect to the driving worm according to the invention.

DESCRIPTION OF THE PREFERRED EMBODIMENTS

Figure 1:
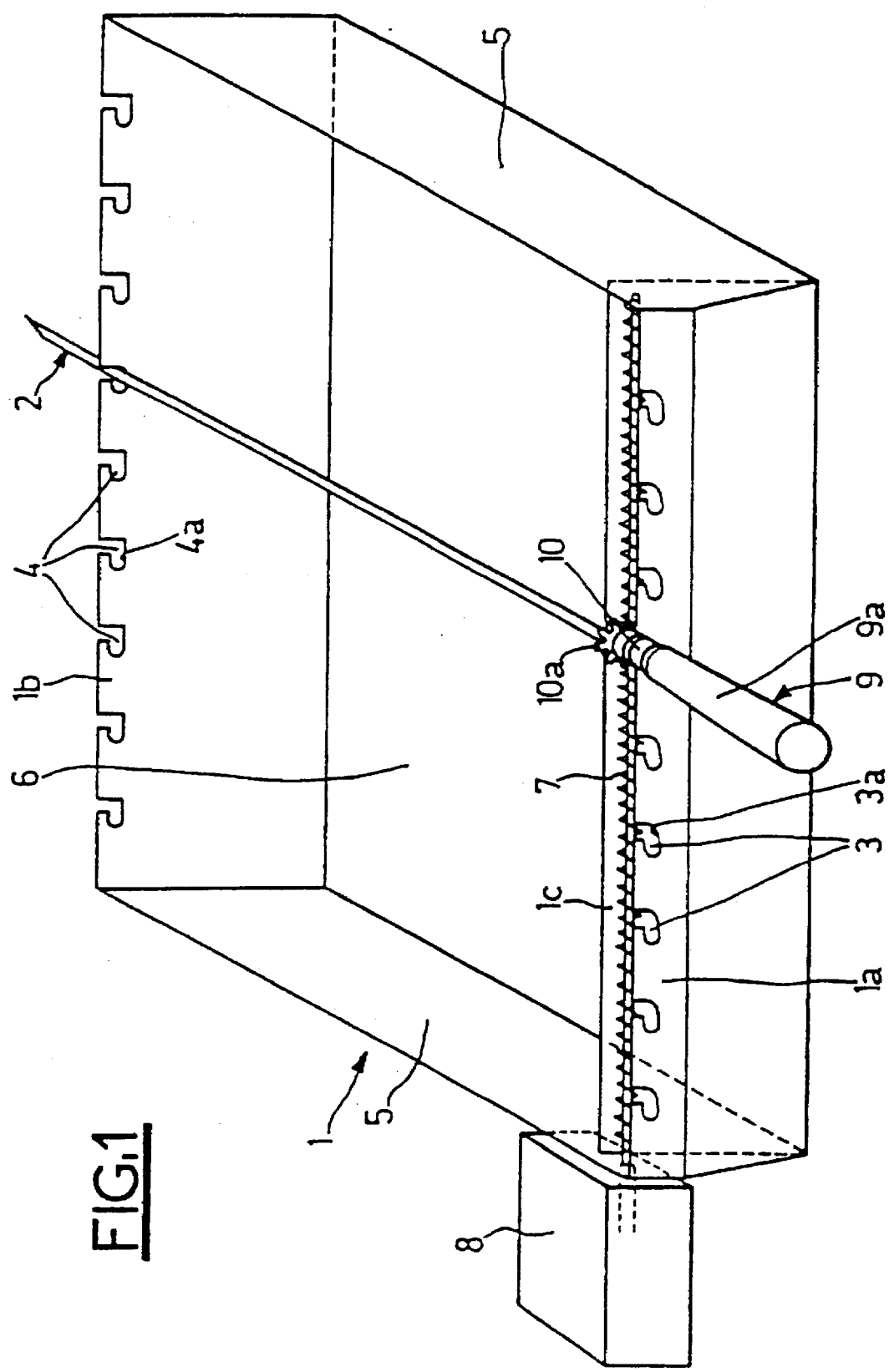
FIG. 1 is a diagrammatic view of an automatic kebab turner according to the invention.

As illustrated in FIG. 1, the automatic kebab turner according to the invention comprises a support 1 for kebab skewers 2 and a mechanism for driving the kebab skewers.

The support 1 has a front panel 1a provided with a plurality of slots 3 on its upper edge, and a rear panel 1b, also provided with a plurality of slots 4 on its upper edge. The slots 3 and 4 are open toward the top and are associated with one another in pairs with a view to supporting the two end parts of the kebab skewers 2. To simplify the drawings, just one kebab skewer is represented in FIG. 1.

The front panel 1a and rear panel 1b are substantially parallel and vertical and are joined together by two lateral panels 5 to form a rectangular frame, the bottom 6 of which may be open to be placed over a hearth or closed by a plate or metal grating on which a heat source is placed for cooking the kebabs.

Behind the front panel 1a there is a vertical partition 1c of the same length as the front panel 1a and parallel thereto with a view to forming with the front panel 1a a front compartment 1d in which a worm 7 is mounted, the ends of which worm are supported by the two lateral panels 5 of the support 1. One end of the worm 7 is rotationally coupled by means of a driving square to the shaft of an electric motor 8 which is mounted on one of the lateral panels 5 of the support. The electric motor 8 may be driven by batteries or connected to a source of electrical energy by means of an electric lead which has not been represented. The motor 8 drives the worm 7 in rotation itself. Each kebab skewer 2 is equipped at one end with a handle 9 which has a connecting part 10 made of a metallic material in the form of a piece of cylindrical overall shape provided with a cog wheel 10a intended to be meshed with the worm 7.

FIG. 2 shows in more detail the structure of the handle 9 as well as the mechanism for rotationally driving the kebab skewer 2 by means of its handle 9. The handle 9 comprises a part 9a for holding which may be made of wood or plastic which is a poor conductor of heat, and a connecting part 10 consisting of a metallic cylindrical piece. The cylindrical metallic piece 10 has one end 10b securely fastened to the part 9a for holding and followed by a peripheral circular groove 10c intended for positioning and keeping the handle 9 in a slot 3 of the front panel 1a of the support 1. The cylindrical piece 10 has a central axial opening 10d to accommodate one end of a kebab skewer 2. The kebab skewer 2 may be fixed permanently to the metallic piece 10 or advantageously fixed removably to this metallic piece 10, it then being possible for fixing to be by means of a clip 11 housed in a peripheral groove 10e and locking the end part of the kebab skewer 2 in the central axial opening 10d of the cylindrical connecting piece 10. In this way, the removable handles 9 may be associated with different types of kebab skewer.

The worm 7 in the front compartment 1d behind the front panel 1a meshes with the teeth of the cog wheel 10a of the connecting piece 10 of the handle 9. The teeth of the cog wheel 10a are advantageously curved so as to increase the surface area for contact with the thread of the worm 7 and improve the mechanical transmission between the worm 7 and the cog wheel 10a.

When the kebab turner is in operation, the electric motor 8 rotationally drives the worm 7 which in turn rotationally drives the cog wheel 10a of the handle 9. The kebab skewer 2 associated with the handle 9 is therefore rotationally driven to allow the foodstuffs threaded onto this skewer to be cooked. The rotational speed of the kebab skewer 2 is controlled by the electric motor 8.

In general, a certain number of kebab skewers 2 are placed on the support 1. It sometimes happens that the rotation of one of the kebab skewers 2 becomes locked up in an untimely fashion, something which may occur for example when the kebab turner is exposed to inclement weather which causes seizure of the metallic piece 10 for connecting the handle 9 and the worm 7 and/or the slot 3 of the front panel of the support. The same phenomenon may occur in the event of a great deal of friction between foodstuffs which have been poorly threaded onto skewers or poorly cut to size on two or more adjacent kebab skewers. In this case, the invention makes it possible to avoid the locking-up of the kebab turner and allows the other kebab skewers 2 to continue to turn despite the fact that one of them has locked up.

FIGS. 3a to 3d illustrate this mechanism for automatically disengaging the kebab skewer which has locked up from the driving worm with the operational states illustrated.

FIG. 3a represents the normal state of operation of the kebab turner with the cog wheel 10a of the handle 9 meshed completely in the screw thread of the driving worm 7. The slot 3 on the front panel 1a displays an elbowed profile, the opening of which points upward vertically and the elbowed part of which points substantially horizontally, the external profile of the elbow being rounded. The lower edge 3a of the elbowed part is slightly inclined toward the bottom of the slot 3 which exhibits a semicircular profile for accommodating the bottom of the annular groove 10c of the connecting piece 10 of the handle. The screw thread, together with the direction of rotation of the worm 7 are selected so that the cog wheel 10a is driven in rotation in the direction indicated by the arrow 12, which direction of rotation tends to press the bottom of the annular groove 10c of the handle into the bottom of the slot 3 on the front panel 1a as indicated by the arrow F. The elbowed part of the slot 3 has an upper edge 3b which prevents the upward movement of the handle, in order hence to ensure a perfect meshing of the cog wheel 10a with the worm 7.

FIGS. 3b and 3c diagrammatically illustrate the disengagement of the cog wheel 10a, the rotation of which has locked up, from the worm 7. The rotation of the worm 7 imposes, by means of its screw thread, a movement of the handle which is locked up toward the opening of the slot 3 in the front panel 1a in the arrowed direction, moving away from the bottom of the slot 3 (FIG. 3b), the slight slope of the lower edge 3a of the elbowed part of the slot 3 favoring the movement of the cog wheel 10a away from the worm 7. Likewise, the rounded outer profile of the elbow in the slot 3 allows the locked-up cog wheel 10a to be disengaged from the worm 7 gently (FIG. 3c). Thus, the locking-up of the rotation of one kebab skewer automatically leads to this skewer being disengaged from the drive mechanism which continues to operate in order to drive the other kebab skewers in rotation.

It may happen that partial disengagement of the initially locked-up kebab skewer is enough to unjam it (FIG. 3b). The invention allows such semi-disengaged operation of the kebab skewer in question without complete disengagement (FIG. 3c) being necessary.

FIG. 3d shows the mechanism for automatically engaging the cog wheel 10a of the handle of a kebab skewer laid down in the slot 3 in the front panel 1a, or just after disengagement of this skewer which was locked up. The direction of rotation and screw thread of the worm 7 rotationally drives the cog wheel 10a which is thereby pushed towards the bottom of the slot 3 as indicated by the arrow. The return of the cog wheel 10a towards the bottom of the slot 3 is favored by the slight inclination of the lower edge 3a of the slot 3. Engagement thus takes place automatically.

The automatic engagement and disengagement mechanism which has just been described may be further improved by a specific cutting-out of the slots 4 in the rear panel 1b of the support 1 (FIG. 1). The profile of each slot 4 may be identical to the profile of the slots 3 of the front panel 1a of the support so that the kebab skewer 2 involved in engagement and disengagement is not shifted off axis with respect to the normal operating position. Another possibility consists in providing an elbowed profile for the slots 4 in the rear panel 1b with a lower edge 4a of the elbowed part substantially parallel to the upper edge of the rear panel 1b and with the outer profile of the elbow at right angles. Such a profile of the slot 4 favors the horizontal movement of the free end of the kebab skewer 2 during the engagement and disengagement mechanism [sic] and prevents this free end of the kebab skewer from coming out of the slot 4 during disengagement of the kebab skewer. The profile of the slot 4 combined with the profile of the slot 3 makes it possible to accommodate floating kebab skewers. What happens is that in the event of friction due to poor cutting to size of the foodstuffs threaded onto adjacent kebab skewers, the specific profiles of the slots 3 and 4 allow a right-to-left or left-to-right lateral movement of the kebab skewers. This lateral movement ensures correct positioning of the kebab skewers as a function of the size of the foodstuffs threaded on them, to allow correct rotation of the kebab skewers.

By virtue of the invention, automatic kebab turners may be produced which are particularly reliable in operation, accidental locking-up of one of the kebab skewers automatically leading to the disengagement of the latter, without the driving of the other said kebabs being disrupted.

Figure 6:
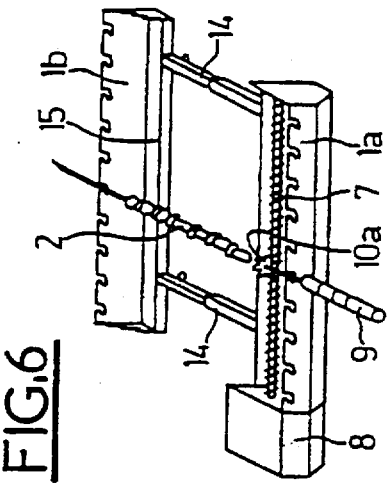
FIGS. 4 to 7 show four other embodiments of the invention.
Figure 7:
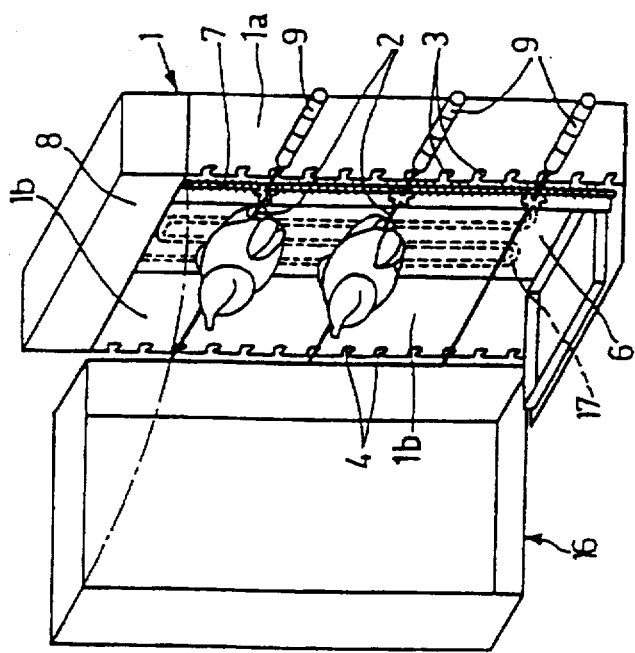
Figure 4:
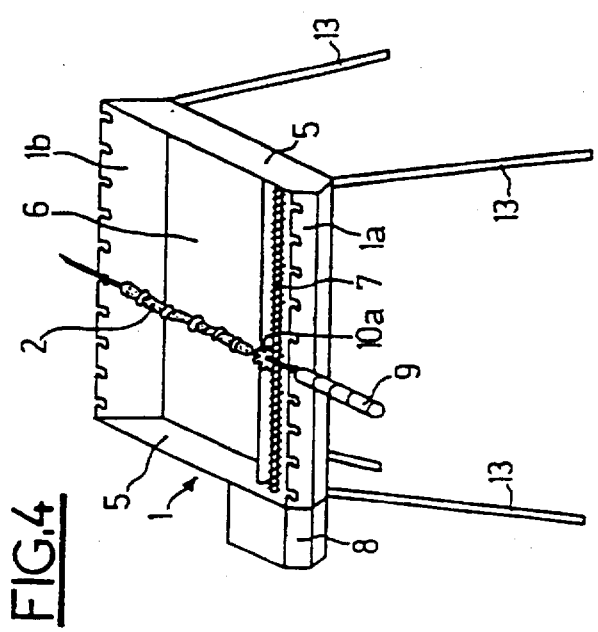
Figure 5:
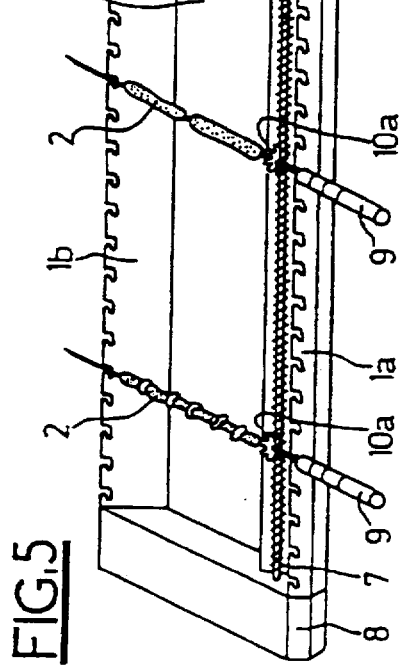

FIGS. 4 to 7 show a few applications of the invention by way of examples. FIG. 4 represents a conventional barbecue made with the aid of the invention, the support 1 being mounted on legs 13. The bottom 6 of the support 1 serving as a support for the hearth [sic]. FIG. 5 shows a large dimension work surface for professional use, which can be set into a kitchen unit. FIG. 6 shows a system in the form of a self-contained kit which can be fitted to other items of apparatus. The front panel 1a and rear panel 1b are joined together by two telescopic members 14 making it possible to adjust the separation between the two panels. The front panel 1a and rear panel 1b of the support may exhibit slideways 15 allowing the ends of the members 14 to slide with a view to adjusting the separation between the two members. FIG. 7 diagrammatically represents a vertically mounted electric kebab turner. In this specific case, it is preferable for the slots 3 and 4 to exhibit the same profile, which emerges in the edge of the panels 1a and 1b of the kebab turner in a way which is slightly inclined upward. Such a profile of the slots 3 and 4 makes it possible to avoid the kebab skewers 2 being able to leave the slots easily. A lid 16 in the form of a glazed door may close off the exposed face of the apparatus. The hearth here consists of an electric element 17 located in a vertical plane close to the bottom 6 of the support 1.

As emerges from the foregoing description, the invention makes it possible to produce an automatic kebab turner which exhibits numerous advantages. It is simple, reliable and inexpensive. It is not prone to seizure due to inclement weather and has no possible locking-up of the other kebabs in the event of one of them locking up, by virtue of the mechanism for automatic disengagement and automatic engagement of the handles associated with the kebab skewers. The kebabs float in the horizontal direction (owing to the width of the elbowed parts of the slots 3 and 4 of the front and rear panels of the support allowing these, in the event that the foodstuffs threaded onto the skewers have been poorly cut to size and in the event of friction between the foodstuffs, to position themselves correctly so that they can continue to turn [sic]. It requires no fixing of the kebab skewers in the support. The handle may be removable to accommodate any type of kebab skewer whatsoever available for sale commercially. It makes it possible to use a highly autonomous micromotor which runs on electric batteries, which therefore gives the kebab turner a high degree of mobility, etc.

I claim:

1. An automatic kebab turner for rotating kebab skewers which each have a handle provided with a concentric cog wheel, said automatic kebab turner comprising a support provided with a front panel and a rear panel, each of said panels having an upper edge and slots formed in its upper edge for accommodating kebab skewers, a worm for engaging the cog wheels on the kebab skewers, a motor driving said worm and rotationally driving the kebab skewers by means of their associated cog wheels, means for automatically disengaging a cog wheel from the driving worm in response to locking up of the kebab skewer associated with said cog wheel, without disrupting the drive of the other kebab skewers.

2. Automatic kebab turner according to claim 1, including means for automatically engaging the cog wheels with the driving worm.

3. Automatic kebab turner according to claim 2, wherein having two telescopic members which join together the front and rear panels of the support to permit adjustments in the spacing between the two panels.

4. Automatic kebab turner according to claim 2, wherein the kebab turner is located vertically with the worm vertical, said slots of the panels emerging in the edge of the these panels in a direction which is inclined slightly upward.

5. Automatic kebab turner according to claim 1, wherein each slot in the front panel of the support has an elbowed profile having a rounded outer edge, the worm having a screw thread and direction of rotation which tend to keep the axis of the handle at the bottom of the slot in response to rotation of the cog wheel.

6. Automatic kebab turner according to claim 5, wherein having two telescopic members which join together the front and rear panels of the support to permit adjustments in the spacing between the two panels.

7. Automatic kebab turner according to claim 5, wherein the kebab turner is located vertically with the worm vertical, said slots of the panels emerging in the edge of the these panels in a direction which is inclined slightly upward.

8. Automatic kebab turner according to claim 5, wherein each slot which has an elbowed profile has a section with a width which prevents any upward movement of the axis of the associated handle, so as to ensure perfect meshing between the associated cog wheel and the driving worm.

9. Automatic kebab turner according to claim 8, wherein each slot which has an elbowed profile has a bottom end and a lower edge which is slightly inclined toward the bottom end of the slot.

10. Automatic kebab turner according to claim 8, wherein each slot on the rear panel of the support has a profile identical to the profile of a corresponding slot on the front panel.

11. Automatic kebab turner according to claim 8, wherein the rear panel has an upper edge, each slot on the rear panel of the support having an elbowed profile, the elbowed part of which has a lower edge which is parallel to the upper edge of the rear panel, and an outer edge which is at a right angle to the upper edge of the rear panel.

12. Automatic kebab turner according to claim 8, wherein the kebab turner is located vertically with the worm vertical, said slots of the panels emerging in the edge of the these panels in a direction which is inclined slightly upward.

13. Automatic kebab turner according to claim 5, wherein each slot which has an elbowed profile has a bottom end and a lower edge which is slightly inclined toward the bottom end of the slot.

14. Automatic kebab turner according to claim 13, wherein each slot on the rear panel of the support has a profile identical to the profile of a corresponding slot on the front panel.

15. Automatic kebab turner according to claim 13, wherein the rear panel has an upper edge, each slot on the rear panel of the support having an elbowed profile, the elbowed part of which has a lower edge which is parallel to the upper edge of the rear panel, and an outer edge which is at a right angle to the upper edge of the rear panel.

16. Automatic kebab turner according to claim 5, wherein each slot on the rear panel of the support has a profile identical to the profile of a corresponding slot on the front panel.

17. Automatic kebab turner according to claim 5, wherein the rear panel has an upper edge, each slot on the rear panel of the support having an elbowed profile, the elbowed part of which has a lower edge which is parallel to the upper edge of the rear panel, and an outer edge which is at a right angle to the upper edge of the rear panel.

18. Automatic kebab turner according to claim 1, wherein having two telescopic members which join together the front and rear panels of the support to permit adjustments in the spacing between the two panels.

19. Automatic kebab turner according to claim 18, wherein the front and rear panels are provided with slideways which make it possible to adjust the separation between the two telescopic members.

20. Automatic kebab turner according to claim 1, wherein the kebab turner is located vertically with the worm vertical, said slots of the panels emerging in the edge of the these panels in a direction which is inclined slightly upward.

* * * * *